US007775818B2

(12) United States Patent
Listl et al.

(10) Patent No.: US 7,775,818 B2

(45) Date of Patent: Aug. 17, 2010

(54) BUS BAR CONNECTION FOR A GAS-INSULATED SWITCHBOARD SYSTEM

(75) Inventors: Peter Listl, Sinzing (DE); Thierry Starck, Tegernheim (DE)

(73) Assignee: Areva T&D SA, Paris la Defense (FR)

(*) Notice: Subject to any disclaimer, the term of this patent is extended or adjusted under 35 U.S.C. 154(b) by 1203 days.

(21) Appl. No.: 10/530,058

(22) PCT Filed: Aug. 16, 2003

(86) PCT No.: PCT/EP03/09080

§ 371 (c)(1), (2), (4) Date: Jan. 18, 2006

(87) PCT Pub. No.: WO2004/034534

PCT Pub. Date: Apr. 22, 2004

(65) Prior Publication Data

US 2006/0166538 A1 Jul. 27, 2006

(30) Foreign Application Priority Data

Oct. 5, 2002 (DE) ................................ 102 46 598

(51) Int. Cl.
*H01R 4/60* (2006.01)

(52) U.S. Cl. ...................................................... 439/212

(58) Field of Classification Search ................. 439/212, 439/559, 213
See application file for complete search history.

(56) References Cited

U.S. PATENT DOCUMENTS 3,746,811 A * 7/1973 Saito .......................... 218/123
6,419,512 B2 7/2002 Starck ........................ 439/278

FOREIGN PATENT DOCUMENTS

| | | |
|---|---|---|
| DE | 35 46 011 A1 | 7/1986 |
| DE | 91 13 013.1 U1 | 3/1992 |
| DE | 19815151 | 10/1998 |
| DE | 298 16 915 U1 | 1/1999 |
| DE | 198 50 694 A1 | 5/2000 |
| EP | 1 111 748 A1 | 6/2001 |
| EP | 1111748 | 6/2001 |
| JP | 04-138006 | 5/1992 |
| JP | 04-190609 A | 7/1992 |
| JP | 11122730 | 4/1999 |
| JP | 2000-59930 A | 2/2000 |

OTHER PUBLICATIONS

International Preliminary Examination Report—PCT/IPEA/409.
International Search Report—PCT/ISA/210.
German Search Report issued on Nov. 18, 2003.
Chinese Office Action issued in corresponding case and German translation thereof.
German Official Report dated May 11, 2010 for corresponding German Application No. 102 46 598.3-34.

* cited by examiner

*Primary Examiner*—Javaid Nasri
(74) *Attorney, Agent, or Firm*—Harness, Dickey & Pierce, PLC

(57) ABSTRACT

A bus bar connection which electrically interconnects switchboard sections by at least one electrical connection element, the bus bar connection including bellows which can be mounted between the switchboard sections, can be filled with insulating gas, and surround the electrical coupling element of the bus bar connection in a gas-tight manner.

14 Claims, 2 Drawing Sheets

F1
FB
F2
IG
SR
SR
KS
SSK

BUS BAR CONNECTION FOR A GAS-INSULATED SWITCHBOARD SYSTEM

PRIORITY STATEMENT

This application is the national phase under 35 U.S.C. §371 of PCT International Application No. PCT/EP2003/009080 which has an International filing date of Aug. 16, 2003, which designates the United States of America, and which claims priority on German patent application number 10246598.3 filed Oct. 5, 2002, the entire contents of each of which are hereby incorporated herein by reference.

FIELD

The present invention relates to a bus bar connection, and to a gas-insulated switchboard system, in particular a gas-insulated medium-voltage system, which is fitted with the bus bar connection.

DESCRIPTION OF THE RELATED ART

In switchboard systems with gas-insulated switchboard sections or similar modules that are connected to one another through bus bar connections, exacting demands are imposed not only on the electrical contacts, but also on the gas seals themselves.

Usually, for example, couplings with double-cone plug-type connectors are used and these are configured as either internal or external cones. Such solutions, which are mostly rigid, require very precise tolerance when positioning the switchboard sections relative to one another. Very exacting demands are also imposed with respect to coaxiality. The same applies to other solutions, in which the switchboard sections are connected by way of an essentially rigid mechanical connection. In addition, gas sealing in the area of the connection also imposes significant demands with respect to technical construction of the bus bar connections. As a consequence of the foregoing, what is desired is gas-insulated connections that are simple to monitor and nevertheless need no "super joint."

SUMMARY

It is the objective of the present invention to describe a bus bar connection for gas-insulated switchboard systems that satisfies the requirements referred to above, and in which the disadvantages addressed heretofore do not occur. In addition, a switchboard system in which the switchboard sections are connected to one another by means of such a bus bar connection is also to be proposed.

Accordingly, it is proposed that a bus bar connection that connects the switchboard sections to one another by means of at least one electrical connecting element be used in a gas-insulated switchboard system that has at least two switchboard sections that are filled with insulating gas, the bus bar connection incorporating bellows that can be filled with insulating gas and are mounted between the switchboard sections and enclose the electrical connection element of the bus bar connection so that it is gastight.

As a result, a very flexible bus bar connection between the switchboard sections or modules of the switchboard system is created, and this offers not only more tolerance when the parts are connected to form a switchboard system; it is less costly than conventional solutions and with respect to its gastightness is more resistant to movements of the switchboard sections or modules that occur because of thermal expansion, flexing of the side walls that results because of variations in gas pressure, and so on. There are also advantages with respect to production of the switchboard system since there is a lesser requirement for precision when manufacturing the gas containers. The present invention also simplifies on-site work that has to be done when setting up the switchboard system, in particular the on-site work related to gas. In addition, maintenance that becomes necessary during operation, in particular replacement of individual switchboard sections or expansion of the switchboard system, is made much simpler. The bus bar connection is gas insulated and for this reason is simple to monitor, for example by using sensors to monitor pressure or density.

Particularly advantageous embodiments of the present invention are set out in the secondary claims.

It is particularly advantageous if the bellows be arranged so as to be axially displaceable. If this is done, it is very simple to dismantle the switchboard system since an air gap can be left between the switchboard sections because of the flexible bellows.

It is also particularly advantageous if the bellows are of metal, and if the bellows incorporate seals as well as attachment elements that can be installed from outside the bellows and which produce a positive and force-derived seal with the outside walls of the switchboard sections. In this connection, it is advantageous if the sealing elements include annular seals and if the attachment elements include screw-type connectors.

Because of these additional measures, it is made particularly simple to install the bellows from the outside and provision is made for easy-to-install, flexible sealing against gas leaks.

A particular advantage is also gained if the electrical connection element of the bus bar connection makes an electrically conductive clamped connection between the switchboard sections. In this connection, it is an advantage if the bus bar connection connects the bus bar tubes of the switchboard sections to one another and if at least one of the bus bar tubes extends into the area of the bus bar connection that is enclosed by the bellows so that, when the bellows are filled, the insulating gas flows into the bellows through this bus bar tube. It is preferred that the ends of the two bus bar tubes extend into the bellows so that insulating gas can be supplied from both sides.

It is also a particular advantage if the electrical connection element is a clamp that is fitted with tension springs and adapts to the inside walls of the bus bar tubes; and if the clamp forms an electrically conductive connection—which is not a mechanical seal—between the bus bar tubes so that the insulating gas flows both from the one bus bar tube into the other bus bar tube as well as into the interior of the bellows.

This makes it possible to fill the connection area with gas that is introduced centrally through one bus bar tube. To this end, any air in the intervening space is first evacuated and then this intervening space is filled with insulating gas.

BRIEF DESCRIPTION OF THE DRAWINGS

The present invention and its associated advantages will be described in greater detail below on the basis of an embodiment that is shown in the drawings appended hereto. These drawings show the following.

DETAILED DESCRIPTION

Figure 1:
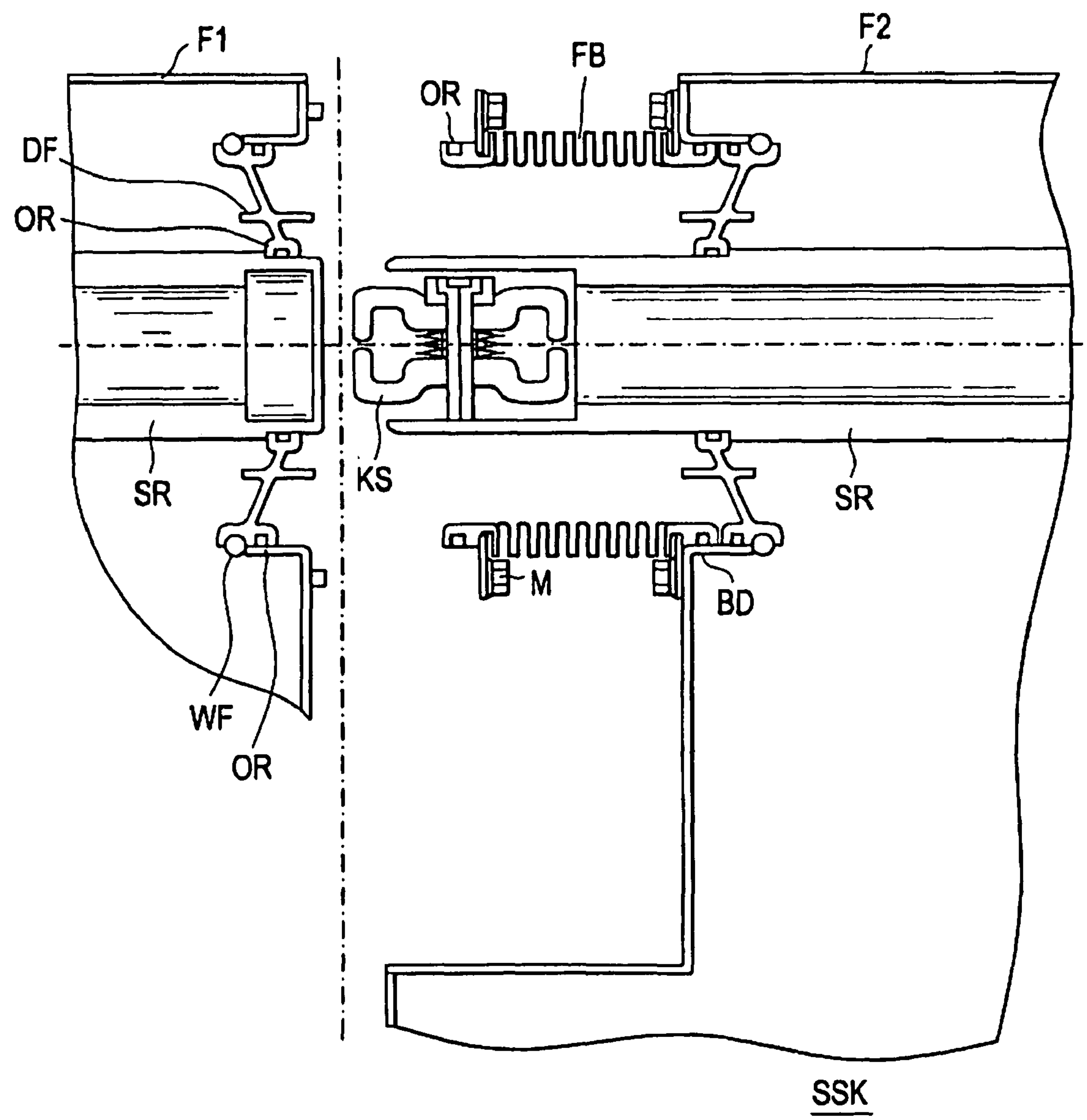
FIG. 1: The bus bar connection according to the present invention, prior to the switchboard sections being connected.

FIG. 1 shows a cross section through a bus bar connection SSK when disconnected; this is intended to connect two switchboard sections F1 and F2 (left-hand and right-hand sections of the drawing) that are to be connected to one another.

Within the gas containers of the two switchboard sections F1 and F2 there are bus bar tubes SR1, SR2, one end of each of these extending from the container so as to be gastight, in order that they can be connected to one another through the bus bar connection SSK. The gas chambers GR1 and GR2 of the switchboard sections F1, F2 are filled with protective and insulating gas at the factory.

The bus bar tubes SR1 and SR2 are coaxial with one another and the ends of each extend through a channel DF that is sealed off with sealing rings OR, in this instance O-ring seals. All the channels DF are located on a container support BD and are sealed with O-rings OR to prevent the egress of insulating gas. The bus bar tube SR2 of the second switchboard section F2 (right-hand section of the drawing) extends further out from its channel than the corresponding part of the first bus bar tube SR1. The switchboard sections F1 and F2 that are shown are identical; however, the different reference numbers make it clear that the one section F1 is located to the left of the section parting line FT and the other section F2 is on the right of this.

Within the right-hand bus bar tube SR2 there is a clamp KS that is intended to form the electrical contact between the two bus bar tubes and thereby between the two switchboard sections F1 and F2. The clamp KS itself consists essentially of two dish-shaped metal parts that adapt to the inside walls of the bus bar tubes SR1 and SR2. In addition, the clamp KS incorporates at least one tension spring or tension washer that presses the two metal parts firmly against the inside walls of the tubes so as to form the electrical contact.

The clamp KS that is shown in FIG. 1 can be displaced axially and is not clamped on the inside walls. The axial displacement continues as far as the position shown in FIG. 2, i.e., as far as the point where the clamp KS is clamped on the two bus bar tubes.

Figure 2:
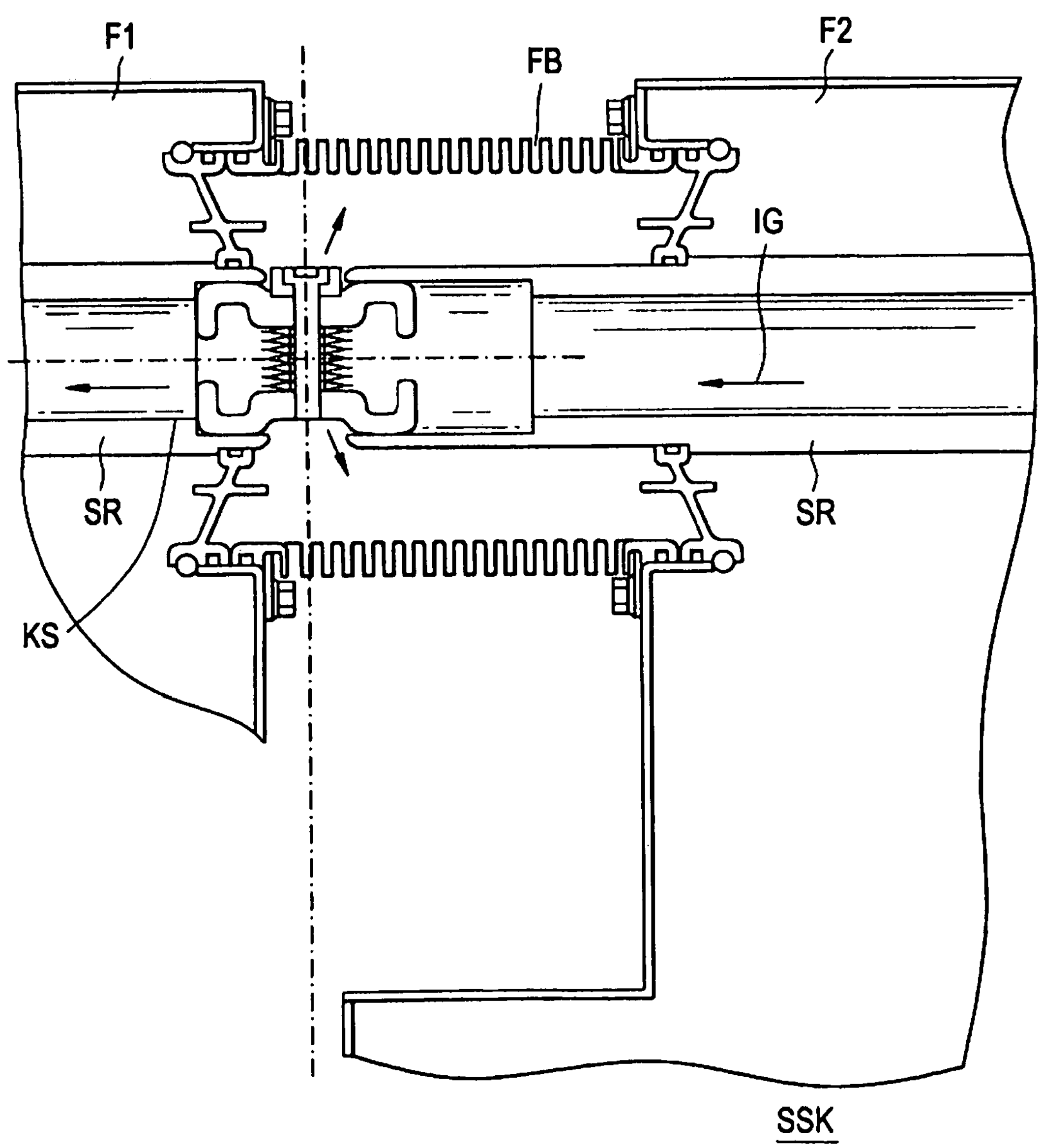
FIG. 2: The bus bar connection after the switchboard sections have been connected.

During assembly (see FIG. 1 and FIG. 2), the bellows, which are preferably of metal, are pressed by arms axially together at its left-hand end so that the electrical coupling element (contact) is accessible and can be moved easily into the connection position (FIG. 2). In contrast to this, when a section is being disassembled from an assembled section, when the connection space is to be evacuated, the metal bellows can be very simply collapsed, the contact clamps loosened, and then slid back.

In order to insulate not only the switchboard sections F1 and F2 of the switchboard system but also to fill the area of the bus bar connection SSK with gas, this area is to be completely enclosed by bellows FB. The bellows FB then provide for gastight insulation of the area and also for the grounded metal encapsulation of the bus bar connection area.

The bellows FB, which are preferably of metal, are installed on the side walls (face ends) of the gas container, i.e., between the switchboard sections F1 and F2. To this end, sealing rings OR (O-rings) and attachment elements M are used, and these provide easily installed sealing. It is preferred that screw elements M (metric nuts and bolts) be used, and these are disposed so as to be accessible from the outside. This means that the bellows FB can be secured very simply from outside using simple tools and if necessary can be partially disassembled, i.e., the bellows are loosened on the left-hand side and then compressed. It is preferred that the bellows be flange mounted on the left-hand wall of the container at the factory.

FIG. 2 shows the completed state that results after the two switchboard sections F1 and F2 have been connected. The clamp KS now grips the ends of the two bus bar tubes SR1 and SR2 positively and securely and thereby forms a good conductive contact. This is achieved, in particular, in that the contact clamps can be deflected, i.e., they can be displaced axially and through an angle.

The bellows FB provide for a very flexible arrangement and for complete sealing of the area around the bus bar connection SSK.

The gas containers of the switchboard sections F1 and F2 are filled with insulating gas at the factory. At the work site, all that has to be done is to evacuate the air from the connection spaces, which is to say from the interior of the bellows FB and the interior space of the bus bar tubes SR1 and SR2, and then fill them with insulating gas. To this end, it is advantageous if the insulating gas IG be introduced into the switchboard system through at least one of the bus bar tubes (in this instance, SR2). The gas can then spread rapidly through the other bus bar tube SR1 and the clamp KS and reach and protect all the other areas.

In a system with a plurality of switchboard sections it is possible, once the bus bar tubes have been assembled, to evacuate all the connection spaces and all the bus bar tubes from one end and then fill them with insulating gas. This represents a single procedure for the majority of the switchboard sections that is, at the same time, a significant reduction of gas work that is to be done on site.

The arrangement that has been proposed also achieves a high degree of flexibility with respect to production, installation, and operation of the system. In particular there are less stringent demands for the precision of the gas container, and compensation of the tolerance in the bus bar area has been achieved. In addition, the cost of gas work during on-site installation is reduced and the replacement of individual parts has been made very much simpler.

As can be seen in FIG. 1, no component extends beyond the parting line FT after the axial compression of the bellows FB and the retraction of the contact element KS. A relatively greater space can be provided between two adjacent sections, so that a section can be removed from the assembly either from the front or from the rear and then replaced by a new section, without disturbing the adjacent sections. The space between two sections is easily bridged by sliding the clamp and by the axial flexibility of the metal bellows.

The embodiment that has been described relates to a single-pole bus bar connection for a gas-insulated medium-voltage switchboard system. The invention relates preferably to a single-pole bus bar with bellows, although it embraces numerous variants and other embodiments such as multipole bus bars and gas-insulated switchboard systems of all sizes and for all voltage ranges.

The invention claimed is:

1. A bus bar connection for a gas-insulated switchboard system, comprising:

at least two switchboard sections filled with insulating gas, from each of which a bus bar tube extends so as to be gastight, the bus bar tubes being connectable to one another through at least one electrical connection element, and with bellows that are configured to be installed between the switchboard sections and enclose the electrical connection element so that it is gastight, wherein at least one of the two bus bar tubes is configured to be filled with insulating gas.

2. The bus bar connection a of claim 1, wherein an end of one of the bus bar tubes or ends of the two bus bar tubes extend into an area that is enclosed by the bellows so that the insulating gas can flow into the bellows through one of the bus bar tubes or through the two bus bar tubes so as to fill the bellows with gas.

3. The bus bar connection of claim 1, wherein the electrical connection element is a clamp that incorporates tension springs or tension washers, which is pressed against inside walls of the bus bar tubes; and in that the clamp forms an electrically conductive connection, which is not a mechanical seal, between the bus bar tubes so that the insulating gas can flow from one bus bar tube into the other bus bar tube as well as into an interior of the bellows.

4. The bus bar connection of claim 1, wherein the electrical connection element is arranged at an end of one of the bus bar tubes so as to be axially displaceable.

5. The bus bar connection of claim 1, wherein the electrical connection element forms an electrically conductive clamped connection between the switchboard sections.

6. The bus bar connection of claim 1, wherein the bellows are of meta, and the bellows incorporates sealing elements and attachment elements configured to be installed from outside the bellows, and to form a positive, force-derived seal with outside walls of the switchboard sections.

7. The bus bar connection of claim 1, wherein the bellows are configured to be filled with insulating gas after installation of the bellows.

8. A gas-insulated switchboard system, comprising:

at least two switchboard sections filled with insulating gas, from each of which at least one bus bar tube extends so as to be gastight, the bus bar tubes being connected to one another through at least one electrical connection element, with bellows installed between the switchboard sections and enclosing the electrical connection element so that it is gastight, wherein the bellows and at least one of the two bus bar tubes are filled with insulating gas.

9. The gas insulated switchboard system of claim 8, wherein an end of one of the bus bar tubes or ends of the two bus bar tubes extend into an area that is enclosed by the bellows so that the insulating gas can flow into the bellows through one of the bus bar tubes or through the two bus bar tubes so as to fill the bellows with gas.

10. The gas insulated switchboard system of claim 8, wherein the electrical connection element is a clamp that incorporates tension springs or tension washers, which is pressed against inside walls of the bus bar tubes, and the clamp forms an electrically conductive connection, which is not a mechanical seal, between the bus bar tubes so that the insulating gas can flow from one busbar tube into the other bus bar tube as well as into interior of the bellows.

11. The gas insulated switchboard system of claim 8, wherein the electrical connection element is arranged at an end of one of the bus bar tubes so as to be axially displaceable.

12. The gas insulated switchboard system of claim 8, wherein the electrical connection element forms an electrically conductive clamped connection between the switchboard sections.

13. The gas insulated switchboard system as of claim 8, wherein the bellows are of metal, and the bellows incorporates sealing elements and attachment elements configured to be installed from outside the bellows, and to form a positive, force-derived seal with outside walls of the switchboard sections.

14. A bus bar connection for a gas-insulated switchboard system, comprising:

a first switchboard section including a first hollow bus bar extending from a main body of the first switchboard section, the first bus bar and the first switchboard section each being gas tight, the first switchboard section filled with a first insulating gas;

a second switchboard section including a hollow second bus bar extending from a main body of the second switchboard section, the second bus bar and the second switchboard section each being gas tight, the second switchboard section filled with a second insulating gas and the second bus bar filled with a third insulating gas;

an electrical coupling element configured to electrically connect the first bus bar to the second bus bar; and a bellows configured to be installed between the first and second switchboards, and enclose a connection between the first and second bus bars in a gas tight manner, the second bus bar configured to fill the connection and the bellows with the third insulating gas after installation of the bellows.

* * * * *